United States Patent

Hickman

[11] Patent Number: 5,881,971
[45] Date of Patent: Mar. 16, 1999

[54] MONITORING SYSTEMS FOR DETECTING FAILURES IN FLY-BY-WIRE AIRCRAFT FLIGHT CONTROL SYSTEMS

[75] Inventor: Alan B. Hickman, Woodinville, Wash.

[73] Assignee: The Boeing Company, Seattle, Wash.

[21] Appl. No.: 441,377

[22] Filed: May 15, 1995

[51] Int. Cl.[6] .............................. B64C 5/00; B64C 13/10
[52] U.S. Cl. ..................... 244/75 A; 244/195; 73/810; 73/811
[58] Field of Search ............... 244/75 R, 75 A, 244/76 C, 194, 195; 73/810, 811, 812

[56] References Cited

U.S. PATENT DOCUMENTS

| | | | |
|---|---|---|---|
| 3,744,300 | 7/1973 | Fleury | 73/67.3 |
| 4,179,940 | 12/1979 | Oertle et al. | 73/808 |
| 4,639,997 | 2/1987 | Brull | 29/407 |
| 4,796,192 | 1/1989 | Lewis | 244/75 R |
| 5,079,955 | 1/1992 | Eberhardt | 73/799 |
| 5,182,449 | 1/1993 | Johnson et al. | 73/800 |
| 5,305,645 | 4/1994 | Reifsnider et al. | 73/808 |
| 5,383,133 | 1/1995 | Staple | 73/583 |

Primary Examiner—Virna Lissi Mojica
Attorney, Agent, or Firm—Christensen O'Connor Johnson & Kindess PLLC

[57] ABSTRACT

A monitoring system for detecting failures, or impending failures, in subsystems of a fly-by-wire primary flight control system of an aircraft. The system monitor a critical variable of at least two controllers acting in concert, in real time. Differences between the critical variables are calculated and, after filtering to remove insignificant variations, structural fatigue damage is estimated based on significant detected variations. Depending upon the relative severity of the estimated fatigue damage, the aircraft's primary flight control computer is programmed to shut down the malfunctioning subsystem, display a message indicating need for repair, or take other appropriate action.

14 Claims, 4 Drawing Sheets

MONITORING SYSTEMS FOR DETECTING FAILURES IN FLY-BY-WIRE AIRCRAFT FLIGHT CONTROL SYSTEMS

FIELD OF THE INVENTION

The invention relates to the detection of failures and potential failures in primary flight control systems. More particularly, the invention provides systems for detecting and predicting failures in fly-by-wire flight systems where failure modes of certain subsystems are not readily predictable.

BACKGROUND OF THE INVENTION

The most typical flight control system used in current aircraft relies upon direct mechanical linkages between the pilot's control devices and aircraft flight control surfaces. Thus, when a pilot manipulates controls such as the rudder pedals, various levers, and the control column, mechanical linkages transmit movement of the controls to aircraft flight control surfaces, such as rudders, ailerons, flaperons, and elevators, to move these surfaces appropriately in response. This system provides several advantages. Not only is the system relatively simple with predictable failure modes and effects, but it provides direct control of the aircraft control surfaces. The system is also reliable, since aircraft manufacturers and operators have had long experience with mechanical flight control systems.

There has now been developed an aircraft flight control system that is not reliant on direct mechanical linkages but uses electronic controllers that receive and transmit electrical signals to control devices, such as hydraulic actuators, that in turn control the movement of aircraft flight control surfaces. This type of system, known as a "fly-by-wire" system, provides significant advantages over the direct mechanically linked flight systems. The use of highly reliable electronic signals generated in response to pilot manipulation of flight deck controls or autopilot commands, instead of mechanical linkages, provides the possibility of improved overall system reliability and performance. Also, the system is easier to maintain.

The fly-by-wire aircraft control system, however, imposes new system monitoring requirements. In general, when a mode of failure of a subsystem is predictable, then a monitor can be developed to sense and signal the failure of the subsystem, when it fails according to the predicted mode. There are, however, certain subsystems for which the failure modes are neither readily predictable nor are symptoms of failure easily detectable. Also, in certain circumstances, monitoring the effects of a failure on a flight control surface may require a very sensitive sensing device, which may lead to false warnings (i.e., an indication of failure when there is none) sometimes necessitating an unnecessary shutdown of the subsystem. For example, if an elevator were monitored by sensing motion of the elevator surface, then setting the sensor to detect only wide variations in movement may not permit detection of smaller movements that may nevertheless result from an actuator malfunction. On the other hand, if the sensor is set for high sensitivity to detect small movements, then the sensor may falsely report failure, when the small movements detected are not symptomatic of a failure, leading to unnecessary system shutdown. Such shutdowns are not only expensive, in terms of unnecessary aircraft downtime for repairs, but may also somewhat decrease flight safety margin by decreasing the redundancy of control systems of the aircraft.

There exists a need for a system for detecting failures in subsystems of fly-by-wire primary flight control systems, especially those subsystems that are not readily monitored because all their failure modes are not readily predictable and may not be easily detected by conventional monitors. Further, the monitoring system should desirably be readily integrated with existing equipment of the primary flight control system and the aircraft's primary flight control computer and should not be susceptible to a high frequency of false positive failure reports.

SUMMARY OF THE INVENTION

The invention provides a monitoring system for detecting failures, or impending failures, in subsystems of a fly-by-wire primary flight control system of an aircraft. The monitoring system is integrated with the primary flight computer of the aircraft, is broadly applicable to a range of subsystems, and is particularly suited to those subsystems that are not susceptible to ready analysis for identifying modes of failure.

The system requires sensors to intermittently monitor, at preselected sampling intervals, an identified critical parameter on at least two cooperating components of a subsystem, such as the differential pressures, or load, of two hydraulic actuators working in concert. The system further includes filtering of the monitored parameters to screen out "noise" or noncritical variations between these parameters and to identify critical variances from expected performance. These critical variances are determined by first selecting a predetermined degree of variance from the expected operation that will be filtered out as an "acceptable" variance. Any variance in excess of the acceptable variance indicates a local maximum or minimum variation and is measured as a "critical" variance, according to the invention. The system of the invention also takes into account the frequency of occurrence of critical variances. Based on the magnitude and frequency of critical variances, the system calculates the rate of change of structural fatigue damage. When the calculated rate of change exceeds a predetermined level, the primary flight control computer takes appropriate action.

According to the invention, several monitor trip levels may be used to determine appropriate action based upon severity of the calculated fatigue failure. For example, if within a time period $dt_1$, the calculated fatigue damage changed by $fd_1$, then action $a_1$ may be indicated. If, within a different time period, $dt_2$, the damage calculated changed by $fd_2$, then action $a_2$ would be indicated, and the like. Generally, the time periods $dt_n$ may vary in magnitude from about 10 seconds to about 100 seconds, and up to the duration of a complete flight. The actions indicated, $a_n$, are dependent upon the severity of the calculated failure. Thus, if the fatigue damage estimated is of a very serious nature, exceeding a predetermined magnitude, the flight control computer shuts down the subsystem. If the estimated damage is not of a very serious nature and does not repeat within a predetermined time period, the subsystem is not shut down, but a signal from the primary flight computer indicates that technical staff should inspect for damage, upon aircraft landing, and that any damage should be repaired before resuming flights. In yet another option, if the fatigue damage estimation is very low, then the primary flight computer may allow continued flights for a predetermined period of time or number of flights.

The monitoring system of the invention also includes safeguards to prevent unnecessary activation of the system due to errant readings. The system is designed to ignore readings when the aircraft operates beyond a certain normal range of parameters, such as may be encountered during dynamic situations of over- or underspeed; or when the aircraft is steeply banked, such as during avoidance maneuver or during an upset; or when the aircraft is within a certain distance of the ground during takeoff. These parameters are part of the flight envelope of the aircraft that is programmed into primary flight computer's control laws. Thus, when envelope protection control law is activated, the step of the monitoring system that shuts down a subsystem determined to be in failure is inhibited. These safeguards are designed to prevent inappropriate shutdown of the subsystem that could create a potentially unsafe condition.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
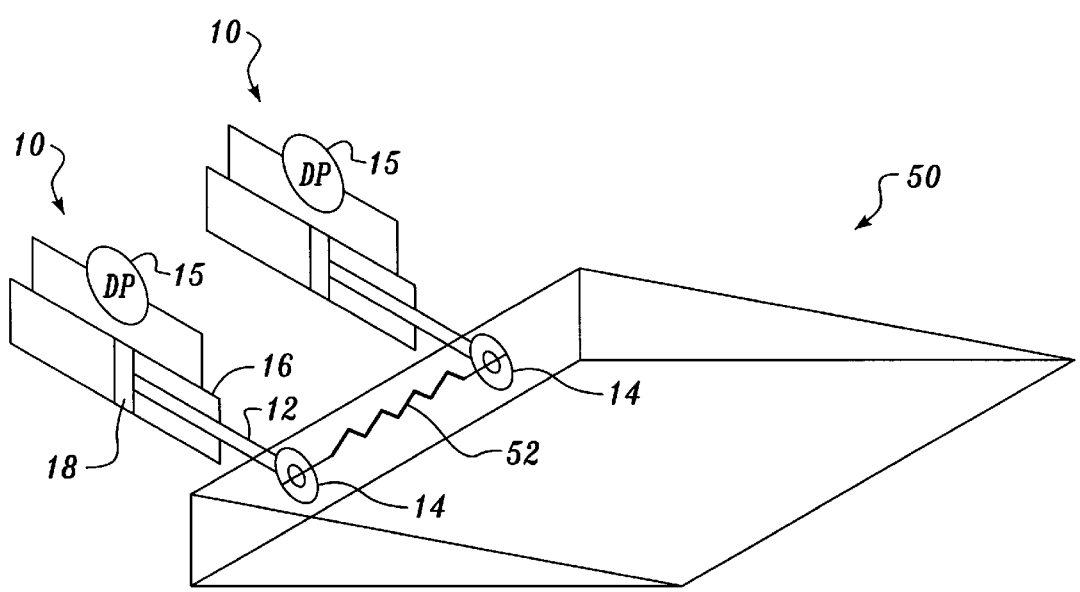
FIG. 1 is a schematic diagram showing hydraulic actuators used to control the orientation of an aircraft flight control surface.

While the monitoring systems of the invention are applicable to a wide range of subsystems of a primary aircraft flight control system, an exemplary subsystem is schematically illustrated in FIG. 1. In this subsystem, two hydraulic actuators 10 act in concert to control the position of an aircraft flight control surface 50. Each of the hydraulic actuators 10 has a cylindrical sleeve 16 filled with hydraulic fluid. Cylindrical pistons 18, each having a central axially mounted rod 12 extending therefrom, reciprocate within sleeve 16. Pressurized fluid is ported to either side of the piston to move the piston, thereby positioning the flight control surface in response to pilot or autopilot commands. The difference in hydraulic pressure between the two sides of the piston, "the differential pressure," is proportional to the airload. This differential pressure is measured by pressure sensor 15. The ends 14 of rods 12 extend out of sleeve 16 and are mechanically coupled to flight control surface 50 so that rods 12 move in concert to command the surface into a desired orientation.

While the actual mechanical coupling of the rods 12 with the aircraft flight control surface is not illustrated in FIG. 1, the structural stiffness of the coupling to the flight surface may be represented by a beam 52. Thus, for instance, if either of actuators 10 fails, resulting in relative out of sync motion between rods 12, then different loads are applied to each end of beam 52. As a consequence, different mechanical loads are applied to the two actuators. If the failure causes these loads to oscillate, fatigue damage will occur and beam 52, or another structural member, may fail due to fatigue.

Figure 2:
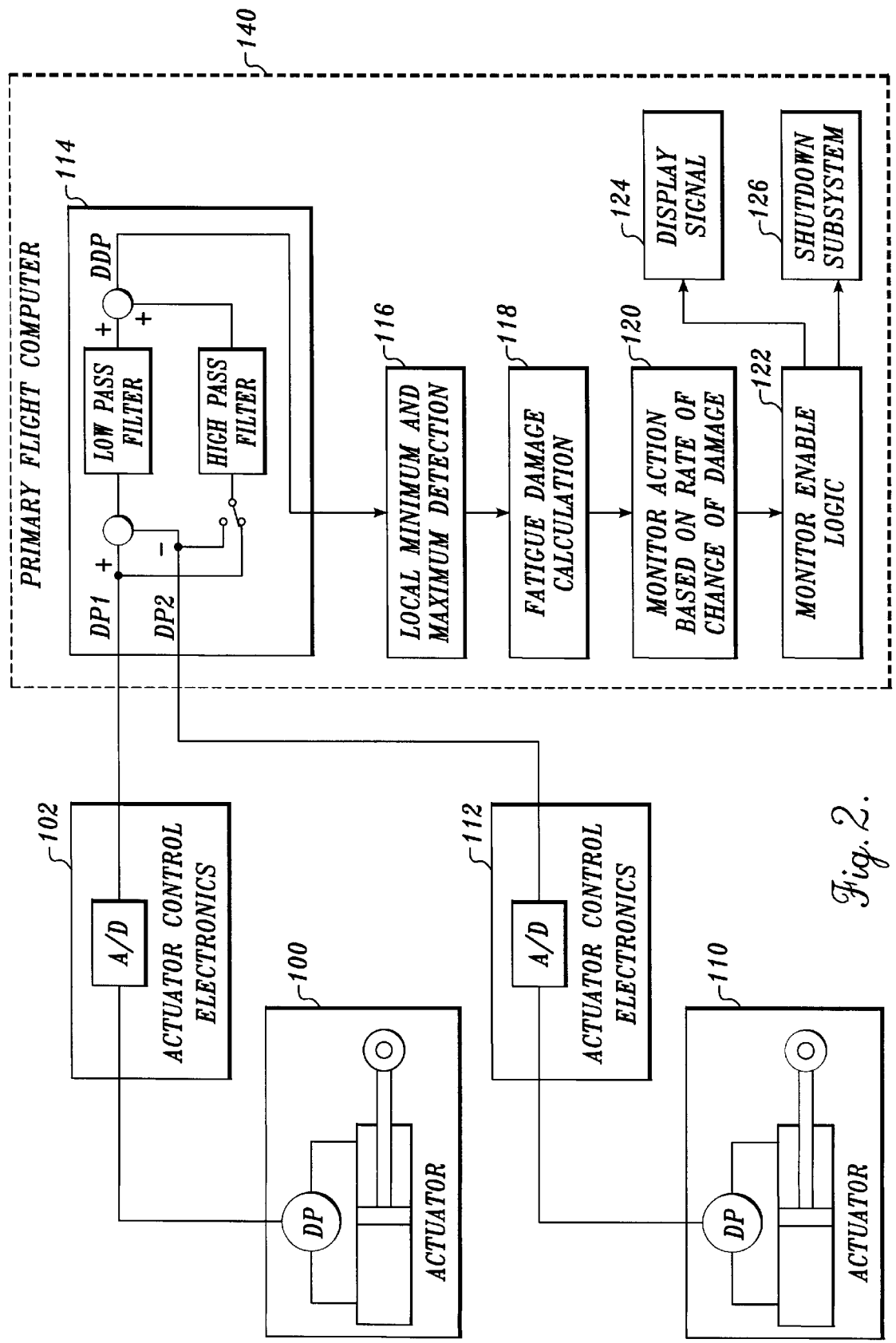
FIG. 2 is a schematic block diagram showing the integration of the monitoring system of the invention with the primary flight computer of the aircraft.

The monitoring system of the invention may be better understood with reference to FIG. 2, a schematic block diagram of an embodiment of the monitoring system. As a preliminary matter, the differential pressure across an actuator piston is represented by "DP", and the difference between the DP of one actuator and the other at any given point in time is represented by "DDP", for ease of description. Devices for controlling the orientation of flight control surfaces are generally electrically linked to control electronics. Thus, actuator 100 is electrically linked to actuator control electronics 102; and actuator 110, operating in concert with actuator 100, is in electrical communication with actuator control electronics 112. Actuator control electronics 102 and 112 periodically monitor the differential pressure (DP) across actuators 100 and 110, respectively, and transmit signals representative of the DPs to the primary flight control computer (a digital signal processor) 140.

In the primary flight control computer, incoming signals from the actuator control electronics 102 and 112 are first analyzed to determine whether there is a critical variance between the operation of actuator 100 and actuator 110 that would indicate that they are no longer acting in concert, but that one of the two actuators is out of synchronization with the other, or is malfunctioning in some other way to impose undue stress upon the flight control surface subsystem. This analysis commences in block 114, where signals are processed through two filters. As a general matter, under nonfailure conditions, the value of DDP, the difference between $DP_1$ and $DP_2$, will remain near zero. However, during failure conditions, the value of DDP will vary depending upon the magnitude and frequency of the failure. At low frequencies, typically less than 5 Hz, $DP_1$ and $DP_2$ will be equal in magnitude, but opposite in phase, thereby producing a large DDP signal. At higher frequencies, above 5 Hz, $DP_1$ and $DP_2$ may differ in magnitude, and become in phase, due to the dynamics of the structure and the actuators. In the event that $DP_1$ and $DP_2$ become in phase, a DDP signal would not accurately represent the true magnitude of the failure or damage that is occurring. The monitor therefore also uses individual DP signals to assess presence of a failure. Thus, in block 114, the difference between $DP_1$ and $DP_2$ is passed through a low-pass filter that attenuates the signal above a certain predetermined cutoff frequency. Since the monitoring system does not determine which of the control system components, such as the two actuators or their control electronics, is in failure, the input signal to the high-pass filter is periodically switched from $DP_1$ to $DP_2$. This allows the system to recognize and take into account magnitudes of signals from each actuator, to calculate damage. While this will not pinpoint which component of the subsystem is in failure, it will ensure that large load variations do not go unmonitored. The high-pass filter attenuates oscillations in the DP signals at frequencies that may result from pilot commands, but allows higher frequencies to pass through to be used in the determination of a failure. Thus, the method of the invention sums the signals from the low-pass and high-pass filters to produce a summed signal that can more accurately identify a failure. This summed signal is transmitted to block 116.

Block 116 includes a routine for the determination of local maxima and minima. The determination of these local maxima and minima is critically important because fatigue damage increases exponentially with the magnitude of load reversals. Therefore, it is important to differentiate between large load reversals and a series of several smaller reversals. The calculation sequence of block 116 is designed to disregard small load reversals, determine the large load reversals, and estimate fatigue damage for the large loads.

Figure 3:
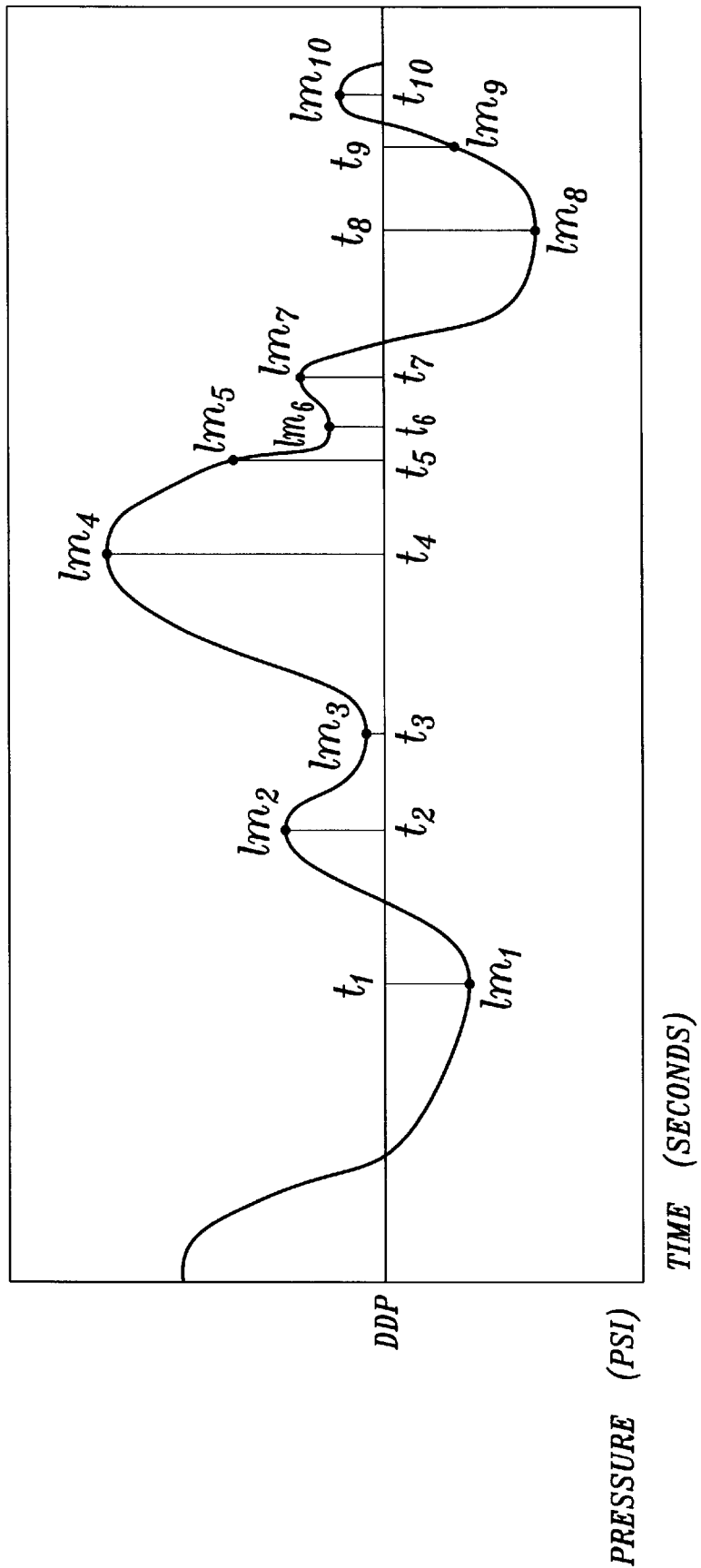
FIG. 3 is an exemplary graphical depiction of signals received from a control device monitored by the system of the invention.
Figure 4:
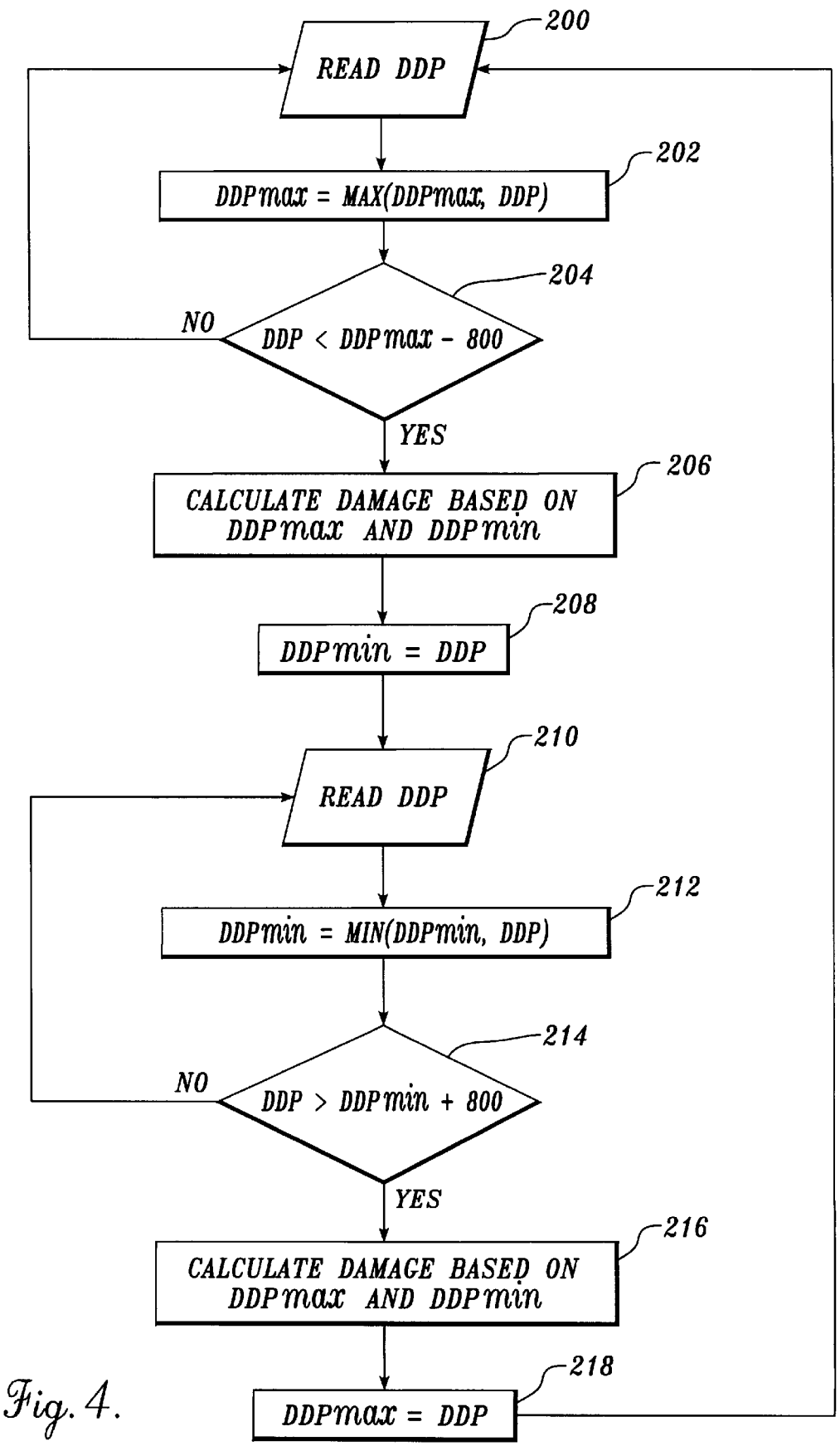
FIG. 4 is a logic flowchart showing steps used in accordance with the system of the invention to detect failure or impending failure in a subsystem.

The method of local maxima and minima detection of block 116 is best understood with reference to FIGS. 3 and 4. FIG. 3 is an exemplary graphical depiction of real-time differences between signals (DDP) calculated from signals (representing DP) that may be received from control devices, monitored by the system of the invention. FIG. 4 is a logic flowchart showing the steps used in local maxima and minima detection. For ease of explanation, a predetermined acceptable variation of 800 psi will be used. Thus, if a variation between compared DPs is less than 800 psi, this is a noncritical difference. Referring to FIG. 4, a first value of DDP is read in block 200. Block 202 compares a stored DDP (which is $DDP_{max}$) with the newly read DDP. If the new DDP is greater than the old $DDP_{max}$, then the new DDP is stored as $DDP_{max}$. In block 204, DDP is compared with $DDP_{max}$–800. If $DDP_{max}$ exceeds DDP by more than 800, then block 206 calculates the fatigue damage based on $DDP_{max}$ and $DDP_{min}$, previously determined. On the other hand, if $DDP_{max}$ is not more than 800 greater than DDP, then a new DDP is read, bearing in mind that the system operates in real time. After the calculation of damage in block 206, DDP is set equal to $DDP_{min}$. A new DDP is now read in block 210 and is compared with a previously stored minimum value of DDP, $DDP_{min}$. A new $DDP_{min}$ is selected from DDP and the previously stored $DDP_{min}$. In block 214, $DDP_{min}$ is compared against DDP. If $DDP_{min}$ is less than DDP by more than 800 psi, then the system calculates damage in block 216 based on $DDP_{max}$ and $DDP_{min}$. If not, then a new DDP is read in block 210. After damage calculation in block 216, DDP is set equal to $DDP_{max}$ and the calculation sequence looks back to block 200, where a new DDP is read in.

The calculation of fatigue damage may be based on appropriate fatigue damage equations found in standard engineering textbooks, such as Shigley & Mitchell, *Mechanical Engineering Design*, McGraw Hill Series in Mechanical Engineering, Fourth Edition. In general, fatigue damage is a function of the following parameters: material of construction of structure; geometry (length, width, cross-sectional area, etc.); stress concentration (hole, thread, fillet, etc.); mean load (½ (maximum load+minimum load)); and alternating load (½ (maximum load–minimum load)). Fatigue damage from each cycle may be summed using Miner's rule, which is also set forth in standard engineering texts.

Typically, load calculations are logarithmic in nature. However, to reduce the computation load for the primary flight computer those may be reduced to a third order polynomial using curve-fitting techniques. This method provides a sufficiently close correlation to the standard fatigue damage equations, while allowing a significant reduction in computational effort.

Applying these steps to FIG. 3, local maxima and minima may be determined at $lm_1, lm_4$, and $lm_8$. Thus, commencing with the assumption that $lm_1$, at $t_l$, identifies a local minimum, a new DDP is read as $lm_2$ at time $t_2$. According to the first loop of FIG. 4, discussed above, $lm_2$ is stored as $DDP_{max}$, since it is larger than any of the intervening values of DDP between $t_2$ and $t_1$. At time $t_3$, DDP has declined from $lm_2$. However, since $lm_3$ is not more than 800 less than $lm_2$, $lm_2$ is not identified as a local maximum. By $t_4$, DDP has increased to $lm_4$. Consequently, $lm_4$ is at this point stored as $DPP_{max}$. At $t_5$, $lm_5$ is more than 800 less than $lm_4$. Thus, $lm_4$ is identified as a local maximum and the routine calculates damage based on the maximum DDP, $lm_4$, and the minimum DDP, $lm_1$. The routine of FIG. 4 now reverts to storing new DDP values as $DDP_{min}$, and continues to read DDPs in real time. Thus, at $t_6$ of FIG. 3, DDP decreases to $lm_6$, while the system continuously compares each DDP read between $t_5$ and $t_6$ to determine a minimum value, and set $DDP_{min}$ equal to that minimum. After $t_6$, DDP increases to $lm_7$. However, $lm_7$ does not exceed $lm_6$, the last $DDP_{min}$, by 800. Thus, the system continues to read DDP values in block 210, and does not calculate damage. At $t_8$, DDP has decreased to $lm_8$, and $DDP_{min}=lm_8$. After $t_8$, DDP increases and, at $t_9$, DDP exceeds $DDP_{min}$ ($lm_8$)+800. At this point, the system calculates damage based on $DDP_{max}$ ($lm_4$) and $DDP_{min}$ ($lm_8$). Thereafter, the system continues to $t_{10}$, etc.

Thus, as can be seen from the foregoing exemplary description, based on FIGS. 3 and 4, the system of the invention identifies large load reversals and calculates damage based on these reversals, rather than on intermediate smaller load reversals.

Returning to FIG. 2, after local maxima and minima have been detected, these are summed to provide a running total of the calculated damage. At predetermined intervals, ranging from 10 to 100 seconds or more, the rate of change of the summed (or total) calculated damage is determined by dividing the change in calculated damage during the predetermined period, by the period. Importantly, this method allows detection of intermittently occurring damage-causing events, that might otherwise go unnoticed. By summing the calculated damage caused by these intermittent loads, and reviewing rate of change of damage over extended intervals of time, up to a complete length of a flight, small intermittent damage is also monitored. Whereas such intermittently occurring damage may be small as individual events, the sum may be large and the rate of change over a sufficiently long period may be sufficient to trigger action.

Block 120 monitors action based on the rate of change of damage. Predetermined critical magnitudes are set for rate of change of damage for predetermined intervals for which such rates are calculated. If the rate of calculated damage exceeds the predetermined magnitude in the predetermined interval, appropriate action is initiated. Thus, if, in any time period $dt_n$, the rate of change of fatigue damage ($fd_n/dt_n$) exceeds a predetermined critical magnitude $(ft)_c$, then action $a_n$ is initiated. For example, if the rate of change of fatigue damage is high and exceeds $(f/t)_c$ in a time period $dt_1$, then $a_1$ may indicate shutdown of the monitored system. However, if the same rate of change of fatigue damage is achieved over a longer period of time $dt_m$, then $a_m$ may indicate less serious action, such as inspection for damage upon landing.

Before displaying results of the monitoring or taking further action, the system executes a precautionary subroutine, shown in block 122, that monitors the enable logic. This subroutine is a safeguard that prevents undesirable activation, and consequent reduced performance and redundancy of the flight control system, when the airplane is operating near the edge of the flight envelope, during maintenance activities, or if the action of the monitor would result in insufficient flight control resources to adequately control the airplane. In block 122, the primary flight computer determines whether the aircraft is subject to any of these conditions. The edge of the flight envelope is programmed into the primary flight computer in the form of airplane envelope protection control laws. These laws are activated when the aircraft approaches the edges of the envelope. For example, control laws include overspeed protection, stall protection, and bank angle protection. When these laws become active, the monitoring system of the invention inhibits the calculation of fatigue damage. Control laws also inhibit the monitor from taking action during the initial takeoff phase of flight, and the final landing phase of flight. In the event that a failure occurs during these portions of a flight, the monitor will delay action until the aircraft has entered a less demanding phase of flight. The primary flight computer also determines the operational state of the aircraft—whether it is in a maintenance state, where abnormal control system responses could occur as a result of maintenance actions. The primary flight computer inhibits the calculation of fatigue damage during maintenance, thereby preventing the possible occurrence of nuisance activations. Importantly, as explained before, the primary flight computer also assesses available resources in the primary flight control system, before the monitoring system is able to take action. If the action that the monitor indicates should be taken would result in insufficient resources to adequate monitor is inhibited from taking action. Additionally, if a second failure occurs in a subsystem that would result in insufficient resources to adequately control the aircraft, the monitor reactivates any system that had previously been shut down. In general, therefore, according to the invention, a primary flight computer of the aircraft overrides the monitoring system failure signal if certain situations identified in the control law are present.

The logic of block 122 is designed to prevent inappropriate shutdown of a subsystem in response to estimated fatigue damage, falsely indicating a failure of the subsystem. If the aircraft is not undergoing maintenance, and is not in an identified edge of the envelope flight pattern, as described above, then the system proceeds to block 124, which displays an appropriate signal to warn aircraft flight and/or ground crew of potential failure in the identified subsystem being monitored. The signal may vary depending upon the severity of the estimated fatigue damage. For instance, as a first option, if the fatigue damage estimated is of a very serious nature, a signal is also directed to block 126, which shuts down the subsystem. In a second option, if the estimated damage is not of a very serious nature then the subsystem is not shut down, but the display signal indicates to the flight and ground crews that the subsystem should be inspected for damage. If the fatigue damage estimated is very low, then the primary flight computer may provide an indication that allows continued flights for a predetermined period of time, or number of flights, before repairs are indicated as necessary.

While the foregoing description has focused on certain embodiments of the invention to aid in providing an understanding of the invention, other embodiments are clearly useful in a variety of subsystems of a fly-by-wire aircraft flight control system. Thus, monitoring need not be of actuators, acting in concert, but may be of any mechanical or electrical system where at least two units operate in concert so that differences in a selected performance variable may be measured and analyzed, substantially as described, to estimate damage or otherwise indicate failure or malfunction. Based on the estimated damage, several options for further action may be available, depending upon the criticality of the subsystem, the flight plan, and a range of other factors, each of which can be programmed into the primary flight computer to automate resultant action (for example, shut down the subsystem) or indicate action needed (display a message).

Of course, it is contemplated that multiple subsystems be continuously monitored using the system of the invention, as described above. Thus, the invention allows comprehensive monitoring of subsystems of a fly-by-wire aircraft control system and thereby enhances safety and reliability of the aircraft.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of monitoring subsystems of a fly-by-wire primary aircraft flight control system, the method comprising:

(a) communicating signals representing loads from each of a first and a second aircraft flight control surface controller to an aircraft onboard digital signal processor, said controllers normally operating in concert;

(b) periodically determining a difference between magnitudes of loads of the first and the second controllers;

(c) comparing a periodically determined difference with a difference in load of a prior period;

(d) calculating fatigue damage resulting from a change of load on the controllers;

(e) calculating a rate of change of fatigue damage based on steps (a) through (d); and (f) selecting at least one response from a range of alternative responses, the selecting based on the rate of change of fatigue damage.

2. The method of claim 1, wherein the step of comparing periodically determined differences includes identifying local maxima and minima.

3. The method of claim 1, wherein the step of calculating includes calculating loads at local maxima and minima.

4. The method of claim 3, wherein the at least one response selected comprises displaying an instructive signal after calculating the rate of change of fatigue damage.

5. The method of claim 1, further comprising monitoring aircraft flight conditions to determine whether limits of aircraft control laws are exceeded; and the at least one response of step (f) comprises inhibiting shutdown of the first and second controllers upon exceeding a limit of the laws.

6. The method of claim 1, further comprising comparing monitoring aircraft flight conditions to determine whether limits of aircraft control laws are exceeded; and the at least one response of the step (f) of selecting comprises inhibiting shutdown of the first and second controllers upon exceeding a limit of the laws.

7. The method of claim 1, wherein the at least one response selected comprises shutting down the first and second controllers when calculated rate of change of fatigue damage exceeds a predetermined standard.

8. The method of claim 1, wherein the first and second aircraft flight control surface controllers comprise a first and a second hydraulic actuator, respectively, each of said actuators mechanically coupled to a single aircraft flight control surface to orient the flight control surface in accordance with actuator urging.

9. A monitoring system for subsystems of a fly-by-wire primary aircraft flight control system, the monitoring system comprising:

(a) an aircraft flight control surface;

(b) a first and a second cooperating controller, each in mechanical communication with the aircraft flight control surface to urge the flight control surface into a predetermined orientation; and (c) a digital signal processor in electrical communication with a control electronic unit associated with each of the first and second controllers, the computer performing activities comprising:

(i) determining a difference between magnitudes of loads on the first and second controller from signals from the electronic unit of each of the first and second controllers;

(ii) periodically comparing the determined difference in load magnitude with a prior difference in load magnitude to determine localized maxima and minima;

(iii) calculating fatigue damage based on determined local maxima and minima;

(iv) calculating a rate of change of fatigue damage; and (v) selecting at least one response from a range of alternative responses based on the calculated rate of change of fatigue damage.

10. The system of claim 9, further comprising display means for displaying the at least one response selected by the digital signal process.

11. The method of claim 1, wherein the step (f) of selecting comprises selecting a response of reactivating an aircraft system previously shutdown by the method, when a second failure occurs, the second failure resulting in inadequate control of the aircraft.

12. The method of claim 1, further comprising overriding a selected response when the selected response results in inadequate control of the aircraft.

13. The method of claim 1, wherein the communicating of signals comprises filtering of signals from each aircraft flight control surface controller, and the calculating of fatigue damage includes taking into account the magnitude of filtered signals representing loads on the controllers.

14. The system of claim 9, further comprising: a primary flight control computer, in communication with the digital signal processor, the primary flight computer programmed with protective aircraft control laws and providing a control signal dependent on the laws to inhibit damage calculation activity of said digital signal processor, when said laws are exceeded.

* * * * *